United States Patent
Galbiati

(10) Patent No.: US 12,119,024 B2
(45) Date of Patent: Oct. 15, 2024

(54) METHOD OF OPERATING HARD DISK DRIVES, CORRESPONDING CONTROL CIRCUIT, HARD DISK DRIVE AND PROCESSING DEVICE

(71) Applicant: STMicroelectronics S.r.l., Agrate Brianza (IT)

(72) Inventor: Ezio Galbiati, Agrate (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 18/446,823

(22) Filed: Aug. 9, 2023

(65) Prior Publication Data

US 2024/0096371 A1    Mar. 21, 2024

(30) Foreign Application Priority Data

Sep. 19, 2022    (IT) .......................... 102022000019116

(51) Int. Cl.
*G11B 21/12*    (2006.01)
*G11B 21/10*    (2006.01)

(52) U.S. Cl.
CPC .............. *G11B 21/12* (2013.01); *G11B 21/10* (2013.01)

(58) Field of Classification Search
None
See application file for complete search history.

(56) References Cited

U.S. PATENT DOCUMENTS

| | | | |
|---|---|---|---|
| 6,542,324 B1 | 4/2003 | Galbiati et al. | |
| 6,865,049 B1* | 3/2005 | Codilian | G11B 19/00 360/71 |
| 7,705,548 B2 | 4/2010 | Galbiati | |
| 9,972,348 B1* | 5/2018 | Ferris | G11B 19/047 |
| 2002/0158600 A1* | 10/2002 | Seima | H02P 6/085 318/727 |
| 2003/0102834 A1* | 6/2003 | Hussein | H02P 6/12 318/400.2 |
| 2004/0222758 A1* | 11/2004 | Tagome | G11B 19/2054 |
| 2006/0250099 A1* | 11/2006 | Maiocchi | H02P 25/034 318/400.29 |
| 2008/0303458 A1* | 12/2008 | Galbiati | H02P 25/034 |
| 2009/0218972 A1* | 9/2009 | Yamamoto | H02P 6/14 318/400.09 |
| 2010/0002331 A1* | 1/2010 | Tan | G11B 21/12 360/75 |

(Continued)

FOREIGN PATENT DOCUMENTS

WO    0051118 A1    8/2000

*Primary Examiner* — Fred Tzeng
(74) *Attorney, Agent, or Firm* — Slater Matsil, LLP

(57) ABSTRACT

A back electromotive force (BEMF) of a spindle motor in a hard disk drive is rectified and exploited to drive a voice coil motor (VCM) in the hard disk drive to retract the heads of the hard disk drive to a park position. The VCM is driven in a discontinuous mode comprising an alternation of VCM on-times and VCM off-times. Rectifying the BEMF of the spindle motor is discontinued before the end of the VCM off-times, Toff with the spindle motor brought into a brake condition wherein the spindle motor is short-circuited and the spindle BEMF forces currents through the windings of the spindle motor. The spindle current is thus pre-charged and made ready to cope with a VCM current request at the next VCM on-time.

20 Claims, 10 Drawing Sheets

(56) References Cited

U.S. PATENT DOCUMENTS

| | | | |
|---|---|---|---|
| 2010/0246051 A1* | 9/2010 | Galbiati | G11B 19/2063 |
| 2010/0315738 A1 | 12/2010 | Yamashita et al. | |
| 2012/0161678 A1* | 6/2012 | Maiocchi | G11B 21/12 |
| | | | 318/150 |
| 2019/0356249 A1* | 11/2019 | Linggajaya | G11B 19/2081 |
| 2021/0067068 A1* | 3/2021 | Tsai | H02P 6/153 |
| 2023/0318493 A1* | 10/2023 | Galbiati | H02P 3/18 |
| | | | 318/362 |
| 2023/0352050 A1* | 11/2023 | Galbiati | H02P 3/22 |
| 2024/0038263 A1* | 2/2024 | Galbiati | G11B 19/2063 |
| 2024/0038268 A1* | 2/2024 | Galbiati | G11B 27/36 |

\* cited by examiner

METHOD OF OPERATING HARD DISK DRIVES, CORRESPONDING CONTROL CIRCUIT, HARD DISK DRIVE AND PROCESSING DEVICE

CROSS-REFERENCE TO RELATED APPLICATIONS

This application claims the benefit of Italian Patent Application No. 102022000019116, filed on Sep. 19, 2022, which application is hereby incorporated herein by reference.

TECHNICAL FIELD

The description relates to hard disk drives (HDDs). One or more embodiments can be applied, for instance, to hard disk drives used in processing devices such as computers, servers, data centers, and the like.

BACKGROUND

Hard disk drives (HDDs) employ a spindle motor to rotate one or more disks as well as voice coil motors (VCMs) to move the heads with respect to the disk(s).

An approach in performing emergency (e.g., power-off) retract with a VCM energized with the back electromotive force (BEMF) of the spindle motor involves driving the VCM in a discontinuous mode where the VCM alternates a driving phase followed by a tristate phase.

In such an operation, during the initial portion of the VCM driving phase, a drop in the motor voltage Vmotor may limit the average VCM current available.

SUMMARY

One or more embodiments aim at adequately addressing the issue outlined in the foregoing.

According to one of more embodiments, that object is achieved with a method as set forth in the claims that follow.

One or more embodiments relate to a corresponding controller circuit.

One or more embodiments relate to a corresponding hard disk drive.

One or more embodiments relate to a corresponding processing device. A computer, a server, or data center equipped with a hard disk drive are exemplary of such a device.

The claims are an integral part of the technical teaching on the embodiments as provided herein.

Solutions as described herein involve a spindle current boost in VCM emergency retract in constant velocity (speed) discontinuous mode.

In performing VCM retract at power-off in solutions as described herein, spindle BEMF rectification is performed with synchronous rectification or synchronous spindle step-up and, during the VCM "off" time (Toff) in a discontinuous VCM driving mode, the spindle motor outputs are forced to a brake condition for a pre-defined amount of time before the end of the Toff time.

This facilitates a spindle current pre-charge which in turn facilitates response "readiness" to a VCM current request at the beginning of a subsequent VCM Ton time.

Solutions as described herein facilitate, under the same application conditions, driving into a VCM a higher current, which generates a higher torque. Smaller capacitors can thus be used on the motor voltage (Vmotor) line in so far as spindle motor current pre-charge counters undesired drops on the Vmotor line.

Solutions as described can be used in a wide variety of power "combos" for the HDD market.

In solutions as described herein, spindle BEMF rectification during a VCM constant velocity retract can be performed in a discontinuous mode so that, during VCM Toff time in a VCM discontinuous driving mode, BEMF rectification (irrespective of whether performed with synchronous rectification or with synchronous spindle step-up) is interrupted; the spindle outputs are forced in a brake condition for a (pre-defined) amount of time before the end of the VCM Toff time.

In that way, spindle current is pre-charged and made ready to respond to a request for VCM current at the beginning of a subsequent (next) VCM Ton time.

The spindle brake time over which BEMF rectification is interrupted (discontinued) may be a portion of the VCM off time and/or made programmable.

During the spindle brake time, the spindle current amplitude (intensity) can be made application-dependent or be controlled, e.g., via a current limitation procedure based on detecting the current amplitude. For instance, detection can be via sensing elements (already) integrated in the low-side switches (e.g., field-effect transistors (FETs)) of the triple half-bridge that controls the spindle motor.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

As discussed in the introductory portion of this description, HDD is an acronym for Hard Disk Drive.

A hard disk drive is a basic component of various types of processing devices such as personal computers, servers, data centers or the like and is the physical location where information is stored.

Hard disk drives (HDDs) employ a spindle motor to rotate one or more disks as well as voice coil motors or VCMs to move the heads with respect to the disk(s).

Rectification of the spindle motor back electromotive force, BEMF at power-off so to supply an emergency (head) retract procedure is a desirable feature in HDD applications.

Figure 1:
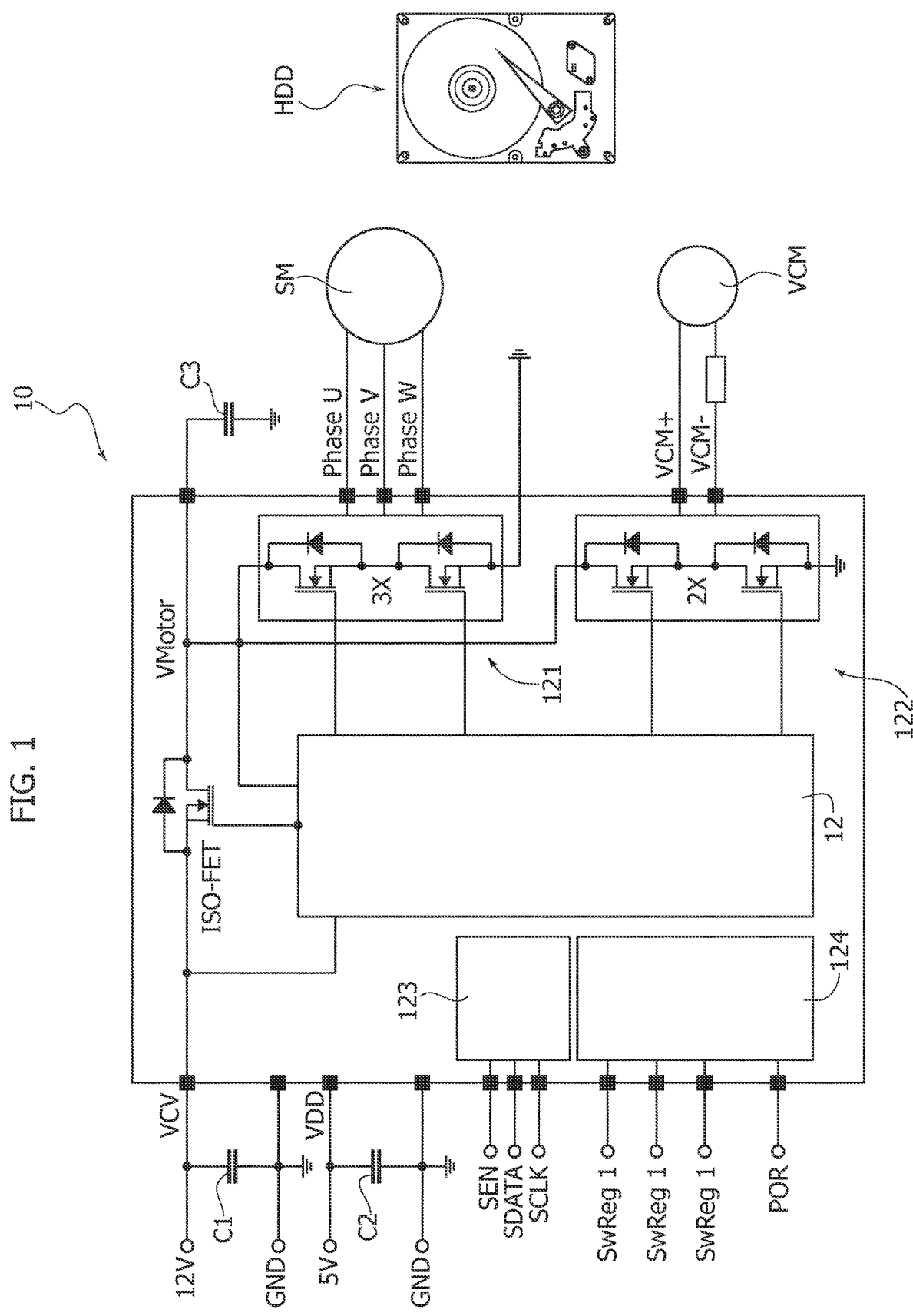
FIG. 1 is a block diagram of a circuit configured to control a spindle motor and voice coil motor in a hard disk drive.

FIG. 1 is a block diagram of a circuit 10 configured to control a spindle motor SM and a VCM in a hard disk drive HDD.

The circuit 10 is built around a spindle and VCM motor controller 12 configured to drive the spindle motor SM via a spindle power stage 121, and the VCM via a VCM power stage 122.

References 123 and 124 in FIG. 1 indicate a serial interface and regulator plus power monitor circuitry.

At supply (e.g., 12V) power off (e.g., emergency power-off), a switch such as isolator field-effect transistor ISO_FET (FIG. 1, top) is immediately turned off by the controller 12 so as to isolate a VCV line/node coupled to the power supply from a line Vmotor intended to provide supply power to the spindle motor SM.

The regulator 12, supplied by the Vmotor (voltage) line, has integrated therein a routine (e.g., SW-based) to implement both rectification of the back electromotive force (BEMF) of the spindle motor SM and parking of the HDD heads via the VCM.

At 12V power-off the ISO_FET is immediately turned off, so as to isolate the VCV line from the Vmotor line; an automatic routine performing both spindle BEMF rectification and parking of the heads is integrated in the Spindle and VCM Motor Controller block that is supplied by the Vmotor voltage.

As discussed so far, the arrangement of FIG. 1 is conventional in the art, which makes it unnecessary to provide a more detailed description herein.

Also, while a single VCM is illustrated herein for simplicity, plural VCMs may be included in a hard disk drive HDD as illustrated herein.

Figure 2:
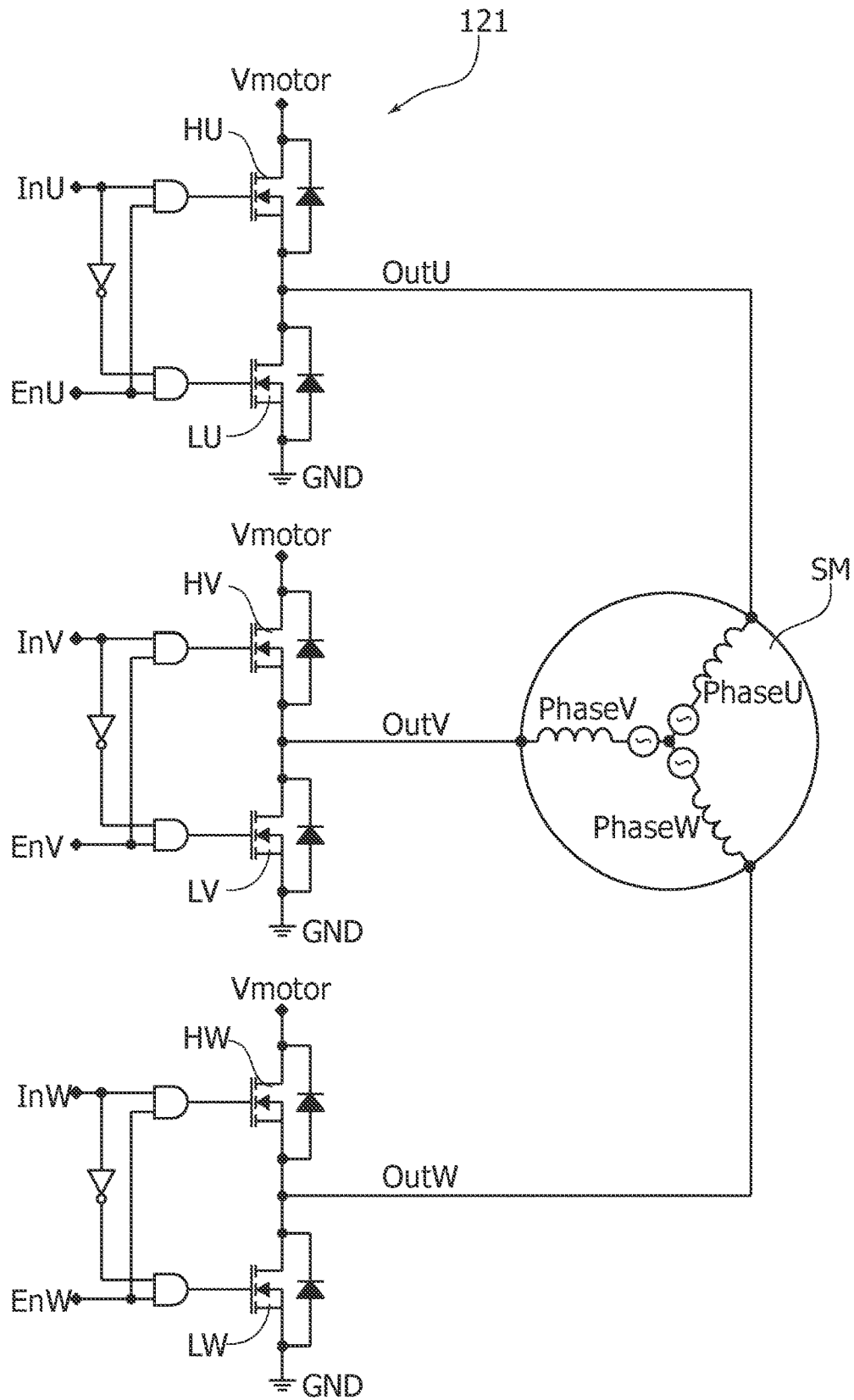
FIG. 2 is a circuit diagram of an implementation of a power stage for controlling rotation of a spindle motor.

FIG. 2 is a more detailed circuit diagram of a possible implementation of a power stage 121 for controlling rotation of the spindle motor SM based on a triple half-bridge arrangement controlled by: three input signals InU (Phase U, PhU), InV (Phase V, PhV), and InW (Phase W, PhW), controlling the activation of the high-side switches HU, HV, and HW or low-side switches LU, LV, LW (e.g., MOSFET transistors) in each half-bridge; and three enable signals, with each half-bridge controlled (enabled) by an enable signal EnU (Phase U, PhU), EnV (Phase V, PhV), and EnW (Phase W, PhW).

As illustrated, each half-bridge comprises a pair of switches HU, LU; HV, LV; and HW, LW having current flow paths therethrough (source-drain, in the case of field-effect transistors such as MOSFET transistors) cascaded between a supply node Vmotor and ground GND.

The representation of the transistors HU, LU; HV, LV; and HW, LW in the figures also includes the respective recirculation (body) diodes.

Driving (that is, making alternatively conductive and non-conductive) the switches HU, LU; HV, LV; and HW, LW is via the respective control terminals (gates, in the case of field-effect transistors such as MOSFET transistors) and logic networks comprising, for each half-bridge (these logic components are shown but not expressly labeled for simplicity in FIG. 2): a first AND gate that has an output driving the control terminal (gate, in the case of field-effect transistors such as MOSFET transistors) of the high-side switch HU, HV, HW and receives as inputs a respective input signal InU (Phase U, PhU) or InV (Phase V, PhV) and a respective enable signal EnU (Phase U, PhU), EnV (Phase V, PhV), and EnW (Phase W, PhW); and a second AND gate that has an output driving the control terminal (gate, in the case of field-effect transistors such as MOSFET transistors) of the low-side switch LU, LV, LW and receives as inputs a respective logically inverted (complemented) input signal InU (Phase U, PhU) or InV (Phase V, PhV) and a respective enable signal EnU (Phase U, PhU), EnV (Phase V, PhV), and EnW (Phase W, PhW).

The phases PhU, PhV, and PhW of the spindle motor are driven via respective signals OutU, OutV, and OutW taken at intermediate nodes of the half-bridge transistor pairs, namely between the transistors HU and LU, between the transistors HV and LV, and between the transistors HW and LW.

An arrangement as illustrated in FIG. 2 is essentially as disclosed in, e.g., U.S. Pat. No. 7,705,548 B2.

Figure 3B:
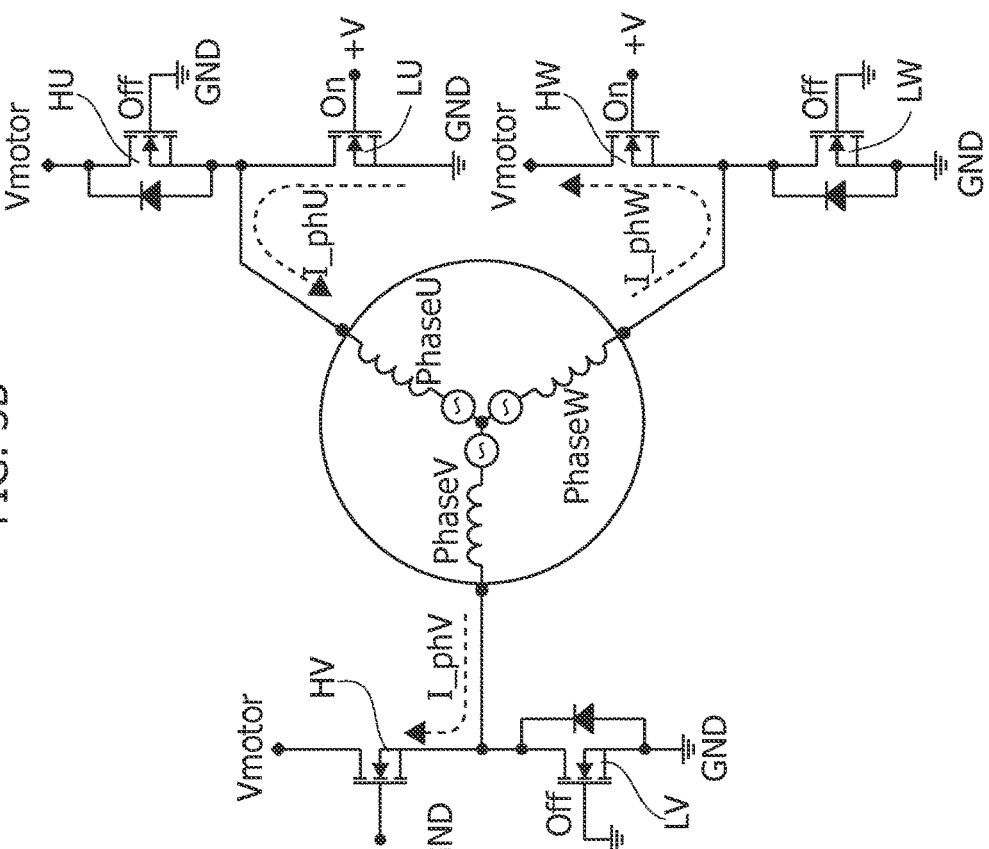
FIG. 3B illustrates operation of a power stage during an active step-up phase of synchronous spindle step-up.
Figure 3A:
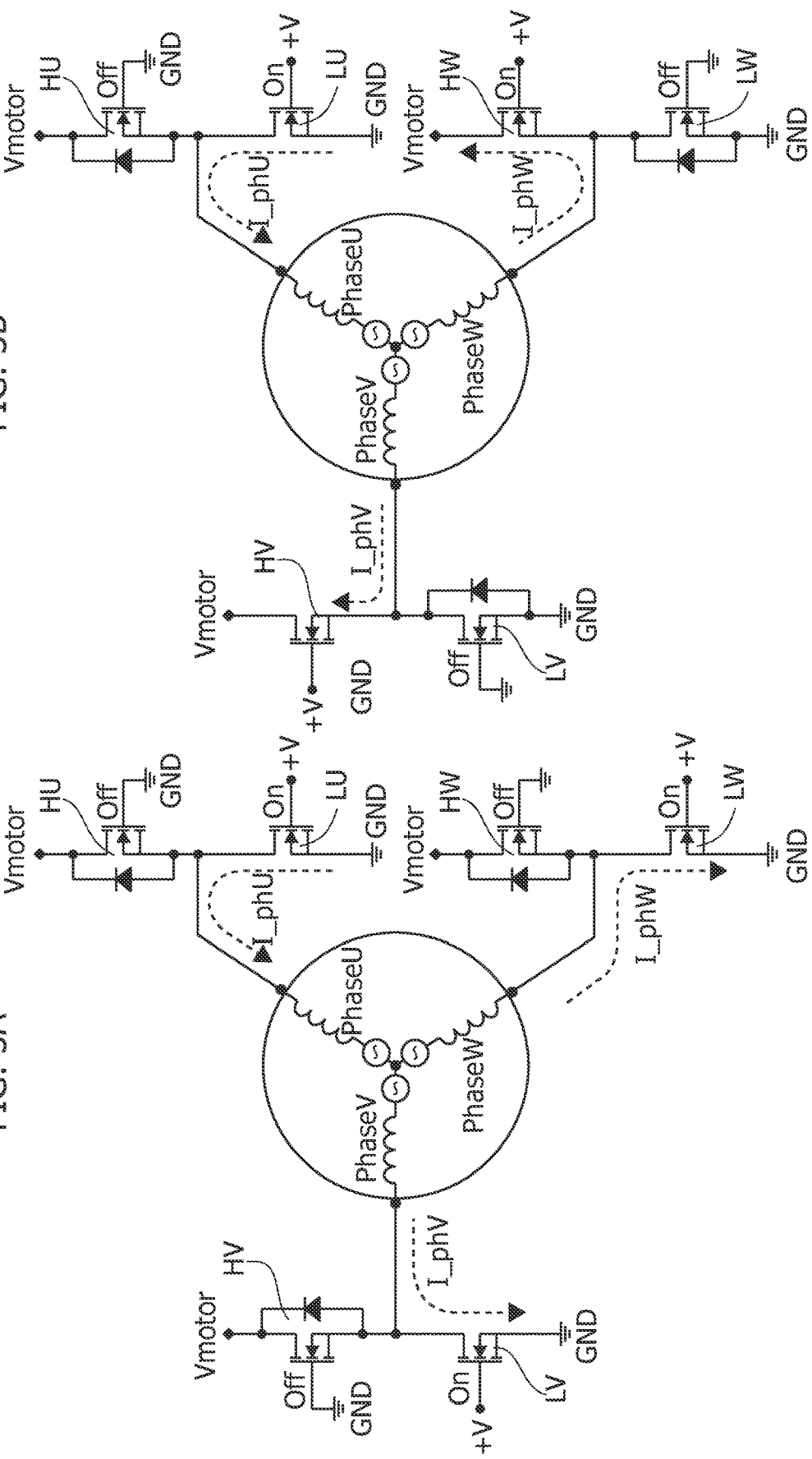
FIG. 3A illustrates operation of a power stage during a brake phase of synchronous spindle step-up.

FIGS. 3A and 3B are illustrative of a possible operating principle of a power stage 121 as illustrated in FIG. 2 during synchronous spindle step-up.

During a brake phase (as illustrated in FIG. 3A): all the three low-side switches LU, LV, and LW are turned on (namely conductive), and the spindle motor SM is short-circuited, with the spindle back electromotive force, BEMF forcing currents I_PhU, I_PhV, and I_PhW through the three windings (e.g., with a current I_PhU flowing into the motor SM and currents I_PhV and I_PhW flowing out of the motor SM).

During an active step-up phase (as illustrated in FIG. 3B) the winding motor currents (e.g., with a current I_PhU flowing into the motor SM and currents I_PhV and I_PhW flowing out of the motor SM) are forced to recirculate to the supply line Vmotor line in response to the (correct) activation (turning on, that is making conductive) of high-side or low-side switches, e.g., LU, HV, and HW in the various half-bridges.

Between the two phases (brake phase of FIG. 3A and active step-up phase of FIG. 3B) a (short) tri-state or tristate phase—not represented in FIGS. 3A and 3B for simplicity—is used to detect the direction of the three winding currents I_PhU, I_PhV and I_PhW to Vmotor or to GND.

The tristate phase facilitates a correct activation of the switches (MOS transistors) HU, LU; HV, LV; and HW, LW during the active phase in performing active step-up of the Vmotor voltage.

Practically such a tristate phase can be regarded as an anti cross-conduction dead time for each half bridge.

Figure 4:
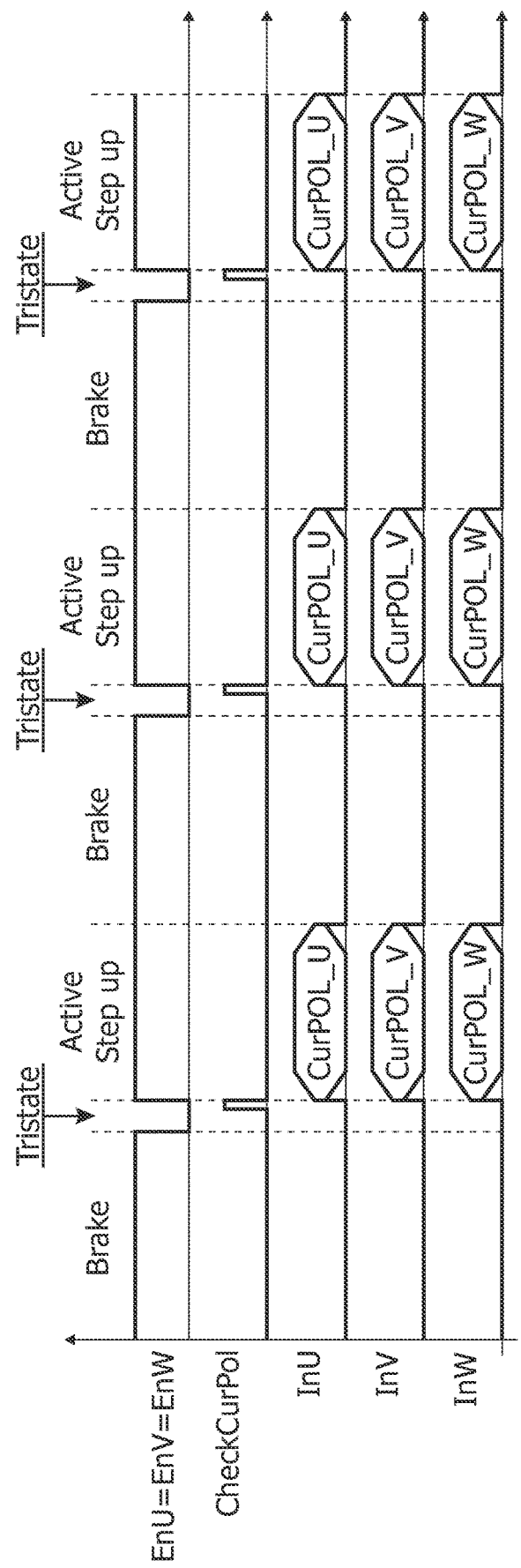
FIG. 4 is a timing diagram for an active step-up procedure.

FIG. 4 comprises plural diagrams representing possible behaviors of signals in the case of an active step-up procedure.

FIG. 4 is a timing diagram showing, against a common (abscissa) time scale, the behavior of the following signals during the Active Step-up procedure: the enable signals EnU, EnV, and EnW, with EnU=EnV=EnW; a signal designated CheckCurPol that activates the detection of the polarities of the spindle currents; and the signals InU, InV, InW that turn "on" (make conductive) the high-side switches HU, HV, and HW or low-side switches LU, LV, LW (e.g., MOSFET transistors) in each half-bridge during the active step-up phase.

For instance, in the case of the U phase, if, during the tristate phase, the current I_phU flows out of the motor SM and recirculates in the body diode of the high-side MOSFET transistor, the signal InU is set to a logic value (e.g., high) such as to turn on the high-side MOSFET transistor of the half-bridge of the phase U.

The signals InU, InV, InW are thus forced to a high logic level or to a low logic level based on the polarity (direction of flow) of the three currents I_phU/I_phV/I_phW detected during the tristate phase.

The signal CheckCurPol activates spindle currents polarity detection during short tristate phases between brake and active step-up phases as illustrated in FIGS. 3A and 3B.

To summarize: spindle BEMF rectification should desirably provide enough voltage and current for safely supply the circuits controlling the movement of the heads on the top of the parking ramp, avoiding the risk to leave them on media; and when performing an emergency retract in constant velocity with the VCM driven in discontinuous mode, the VCM control alternates a driving phase followed by a tristate phase: the driving phase is used to generate torque, moving the heads towards to the parking position, while the tristate phase is used to monitor the VCM BEMF in order to control the parking velocity.

During the initial portion of the VCM driving phase, a drop in the motor voltage Vmotor may limit the average VCM current available. This may be because the spindle current has decreased too much during the previous VCM tristate phase so that, at the activation of the next VCM driving phase, the system is not ready to source instantaneously a VCM current as desired.

This may be particularly the case when a capacitor (see Cvm in FIG. 6, discussed in the following) with a low value (e.g., 10-20 microFarad) is connected to the motor voltage line Vmotor: high-valued capacitances are expensive and thus not commonly used in HDD applications.

Figure 5:
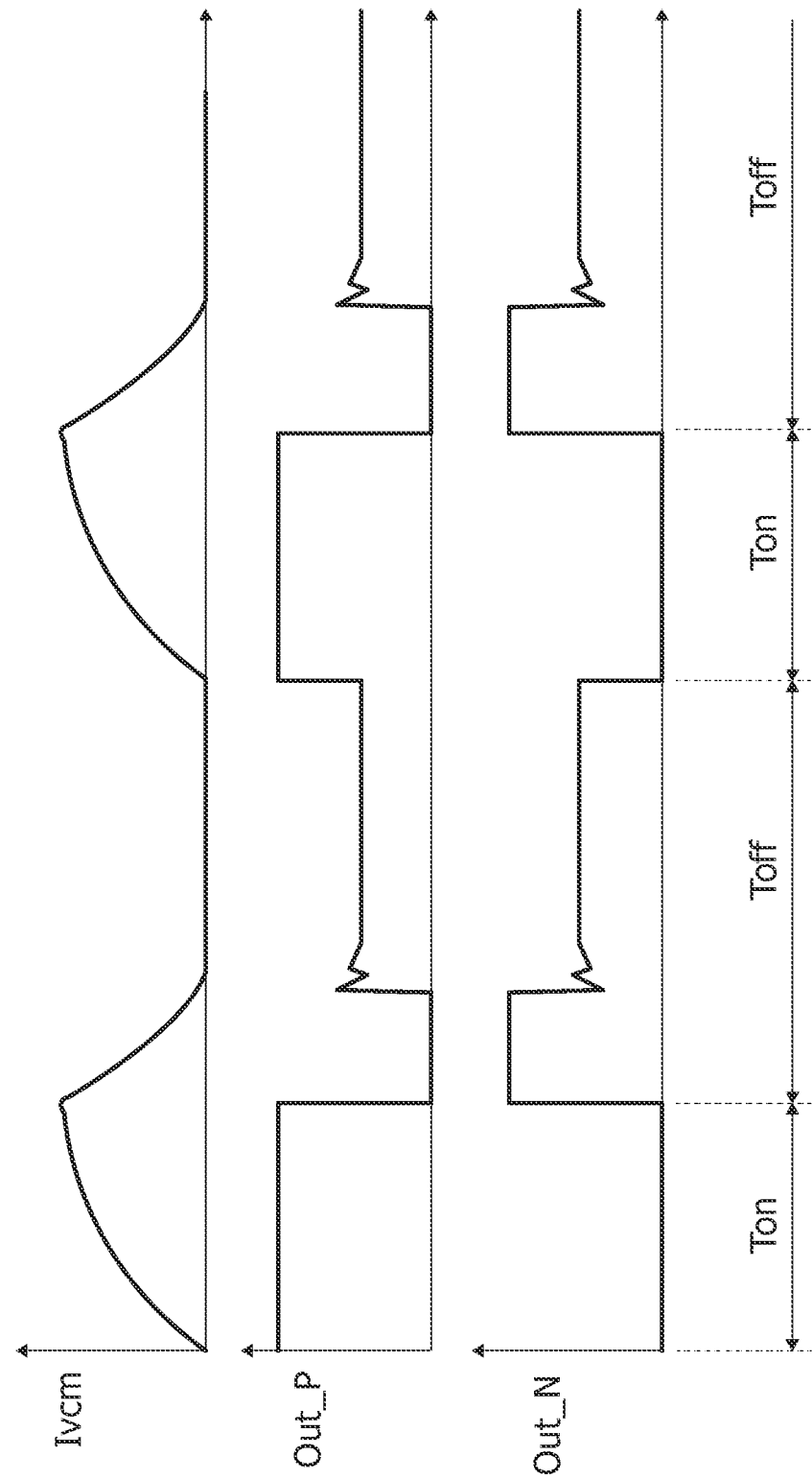
FIG. 5 is a timing diagram for a voice coil motor.

FIG. 5 is exemplary of a VCM driven in a constant velocity emergency retract by controlling the VCM in a discontinuous mode as discussed, e.g., in U.S. Pat. No. 7,705,548 B2 (already cited), in possible combination with VCM velocity control in discontinuous mode (as disclosed, e.g., in U.S. Pat. No. 6,542,324 B1).

Specifically, the curves in FIG. 5 are illustrative of possible time behaviors of the following signals (from top to bottom): the VCM current Ivcm, and the voltages Out_P and Out_N applied across the VCM.

Figure 6:
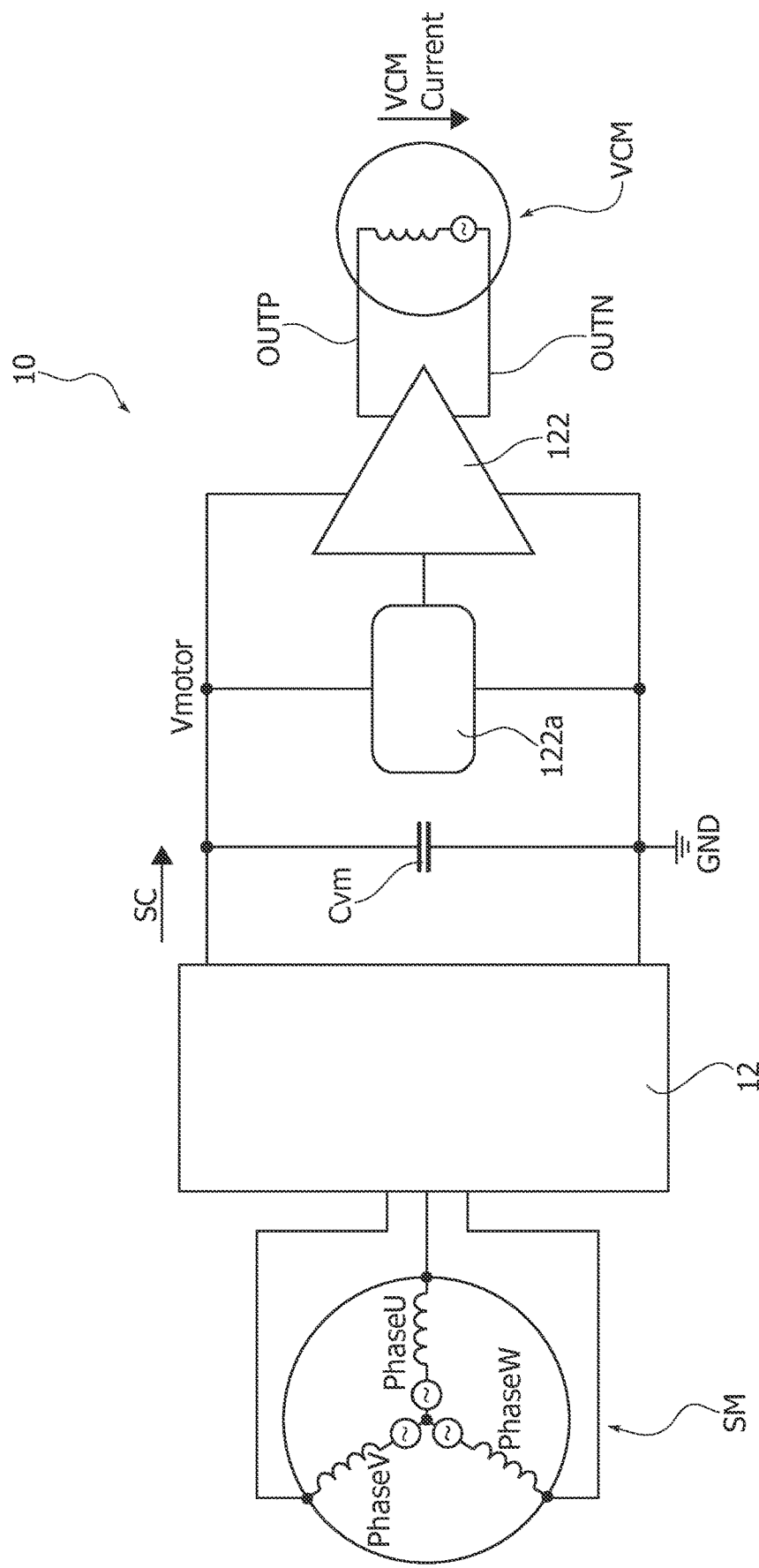
FIG. 6 is a block diagram of a system at power-off.

The meaning of those curves can be appreciated by referring to FIG. 6. FIG. 6 is a simplified block diagram showing the situation of a system as considered herein at power-off (e.g., when a head retract procedure is energized via rectification of the BEMF of the spindle motor SM).

To that effect, the voltages across the windings ("phases" PhaseU, PhaseV, PhaseW in FIG. 1) of the spindle motor SM are supplied to the controller (regulator) 12.

Based thereon, the controller 12 (which may include for that purpose, e.g., a synchronous step-up regulator module operating at 40 kHz with 60% duty-cycle) produces a (rectified) spindle current SC. This current is used to charge a capacitor Cvm coupled to the line Vmotor and referred to a reference node such as ground GND.

The energy stored on the capacitor Cvm can thus be used to implement, via a VCM power stage 122 controlled via a module 122A (operating, e.g., at 1 kHz with 60% duty-cycle), a retract procedure for the VCM.

That is, FIG. 6 is a simplified block diagram of the situation at power off, when, during synchronous step-up, the spindle BEMF is rectified so as to maintain the Vmotor voltage to a level expected to be adequate to facilitate head retract.

Such operation is per se conventional in the art, which makes it unnecessary to provide a more detailed description herein.

Ton time is the VCM driving phase used to generate a driving torque to move the heads towards the parking position, while Toff time is the VCM tristate phase used to sample the VCM BEMF (once the VCM current has decayed towards zero) so to perform velocity control.

Alternation of the Ton and Toff times takes place at a low frequency (in the range of 1 to 3 KHz) and is maintained throughout the retract procedure.

As noted, the spindle outputs can be driven (according to the spindle BEMF rectification approach adopted) with synchronous rectification or synchronous spindle step-up.

Since VCM operation is in a discontinuous mode, the spindle motor current drops close to zero when no current is driven into the VCM.

At the beginning of the subsequent VCM driving phase, the VCM current is sourced first by the capacitor (Cvm in FIG. 6), connected on the Vmotor line, and then, after a certain delay, by the spindle motor SM.

This places a limit on the maximum current that can be driven into the VCM and causes Vmotor to drop to a low value.

Further investigating how VCM retract supplied by spindle BEMF rectification at power off is performed with synchronous spindle step-up under these circumstances shows that all the three spindle outputs are "chopping" at 40 KHz with a 60% Duty Cycle (60% active fly-back and 40% brake).

Of course, that figure is only by way of example: the chopping frequency and the duty cycle can be different according to the application condition.

For instance, VCM discontinuous mode can be performed with a Ton time of 600 microseconds and a Toff time of 400 microseconds, with the selection of the Ton and Toff time are application dependent.

To summarize, conventional solutions using synchronous spindle step-up, as discussed in U.S. Pat. Nos. 7,705,548 B2 and 6,542,324 B1 (both already cited) may suffer from various drawbacks:

The combination of BEMF spindle rectification with VCM retract in a discontinuous mode does not adequately take into account the motor voltage drop issue, which puts a limit on the average VCM current available during the VCM driving phase,
  motor voltage drop can be limited using a high capacitance value connected to the motor voltage line Vmotor, but this is hardly practicable for cost reasons.

In any case, a delay in starting the spindle current with respect to the current driven into the VCM represents a limiting factor for the VCM current amplitude during the Ton time. This was observed to be the case also for VCM retract at power-off with spindle BEMF rectification performed with synchronous rectification.

As described herein, VCM retract at power-off (with spindle BEMF rectification performed with synchronous rectification or with synchronous spindle step-up) involves forcing the spindle motor outputs in a brake condition during the VCM Toff time (in the VCM discontinuous driving mode) for a pre-defined amount of time before the end of the VCM Toff time.

In that way, spindle motor current is pre-charged and ready to respond to a VCM current request at the beginning of the subsequent (next) VCM Ton time.

Solutions as proposed herein are thus applicable in HDD control arrangements wherein the back electromotive force, BEMF of a spindle motor SM is rectified and the (rectified) BEMF of the spindle motor SM is exploited in driving one (or more) voice coil motor, VCM in the hard disk drive 10 to retract the heads of the hard disk drive 10 to a park position (with a constant velocity or speed, for instance).

Driving the VCM(s) is in a discontinuous mode comprising an alternation of VCM on-times, Ton and VCM off-times, Toff.

As proposed herein, rectifying the BEMF of the spindle motor SM is discontinued (interrupted) during the VCM off-times, Toff wherein the spindle motor SM is brought into a brake condition wherein the spindle motor SM is short-circuited and the spindle BEMF forces currents (see I_PhU, I_PhV, and I_PhW in FIG. 3A) through the windings of the spindle motor SM.

This results in an increase in the amplitude (intensity) of the spindle motor current driven by the BEMF of the spindle motor SM: the spindle brake current is a function of amplitude of the spindle BEMF and of the time duration Tbrake of the brake phase BRK.

Rectifying the BEMF of the spindle motor SM can be either via synchronous rectification or via synchronous spindle step-up.

Figure 7:
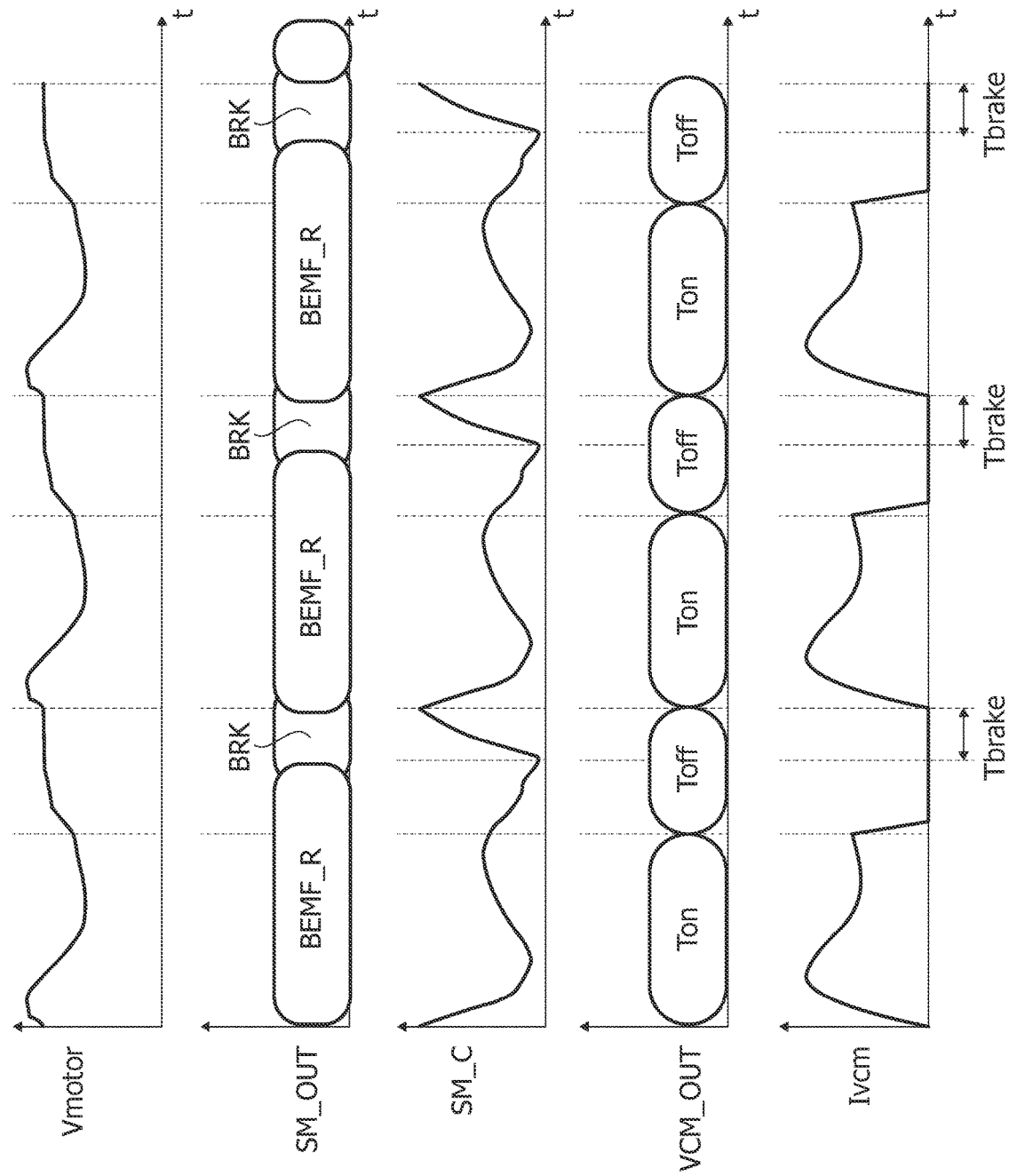
FIG. 7 is a timing diagram for discontinuing spindle rectification alternated with a spindle brake phase.

The diagram of FIG. 7 is generally representative of a solution based on such a concept of interrupting (discontinuing) spindle BEMF rectification BEMF_R and alternating it with a spindle brake phase BRK.

As illustrated, the spindle brake phase BRK starts during the VCM "off" time, Toff, a (pre-defined) time before the beginning of the a subsequent (next) VCM "on" time, Ton.

Specifically, the curves in FIG. 7 are illustrative of possible time behaviors of the following signals (from top to bottom): the spindle motor voltage Vmotor, the spindle motor outputs SM_OUT, highlighting the alternation of BEMF rectification BEMF_R and brake phases BRK, the spindle motor current SM_C, the VCM output VCM_OUT, and the VCM current Ivcm.

The signal VCM_OUT indicates the state of the power stage that drives the VCM: during Ton, the power stage is enabled and controls the current that circulates in the VCM with an adequate polarity, and during Toff the power stage is set to a high impedance state to discharge the VCM current in order to facilitate detecting the BEMF at the end of the Toff time (this indicates the VCM speed or velocity).

The duration of the phase BRK, namely Tbrake can be selected as a portion of VCM off time Toff and can be made programmable according to the application condition.

During the spindle brake phase BRK, all the three spindle outputs are driven low (that is, short-circuiting the motor SM).

In that way the spindle current is caused to increase in amplitude (intensity) because this current is driven by the BEMF of the spindle motor SM.

In these conditions the spindle brake current is a function of amplitude of the spindle BEMF and of the time duration Tbrake of the brake phase BRK.

The spindle brake current can otherwise be kept under control and limited to a desired value, e.g., by using (in a manner known to those of skill in the art) sensing elements (already) integrated in the spindle motor power stage (122 in FIG. 6), e.g., in the low-side switches (e.g., field-effect transistors, FETs) of the triple half-bridge that controls the spindle motor SM.

In that way, at the beginning of the subsequent (next) VCM driving phase, an adequate VCM current Ivcm can be immediately sourced from the spindle motor current (pre-charged during the brake time BRK).

A higher VCM current amplitude (intensity) thus results with a drop in the voltage Vmotor also reduced.

As noted, discontinuing rectifying the BEMF of the spindle motor (SM) and bringing the spindle motor (SM) into a brake condition (BRK) may occur at the end of the VCM off-times, Toff, and/or over a predetermined, optionally programmable, portion of the VCM off-times.

The intensity of spindle motor SM current with the spindle motor SM brought into the brake condition BRK can be controlled.

This approach facilitates obtaining a higher torque generated by the VCM in two critical situations in the retract procedure: initial VCM velocity (speed) recovery, in case a fast VCM seek was commanded just before power-off; and climbing up the ramp at the end of retract procedure.

Figure 8:
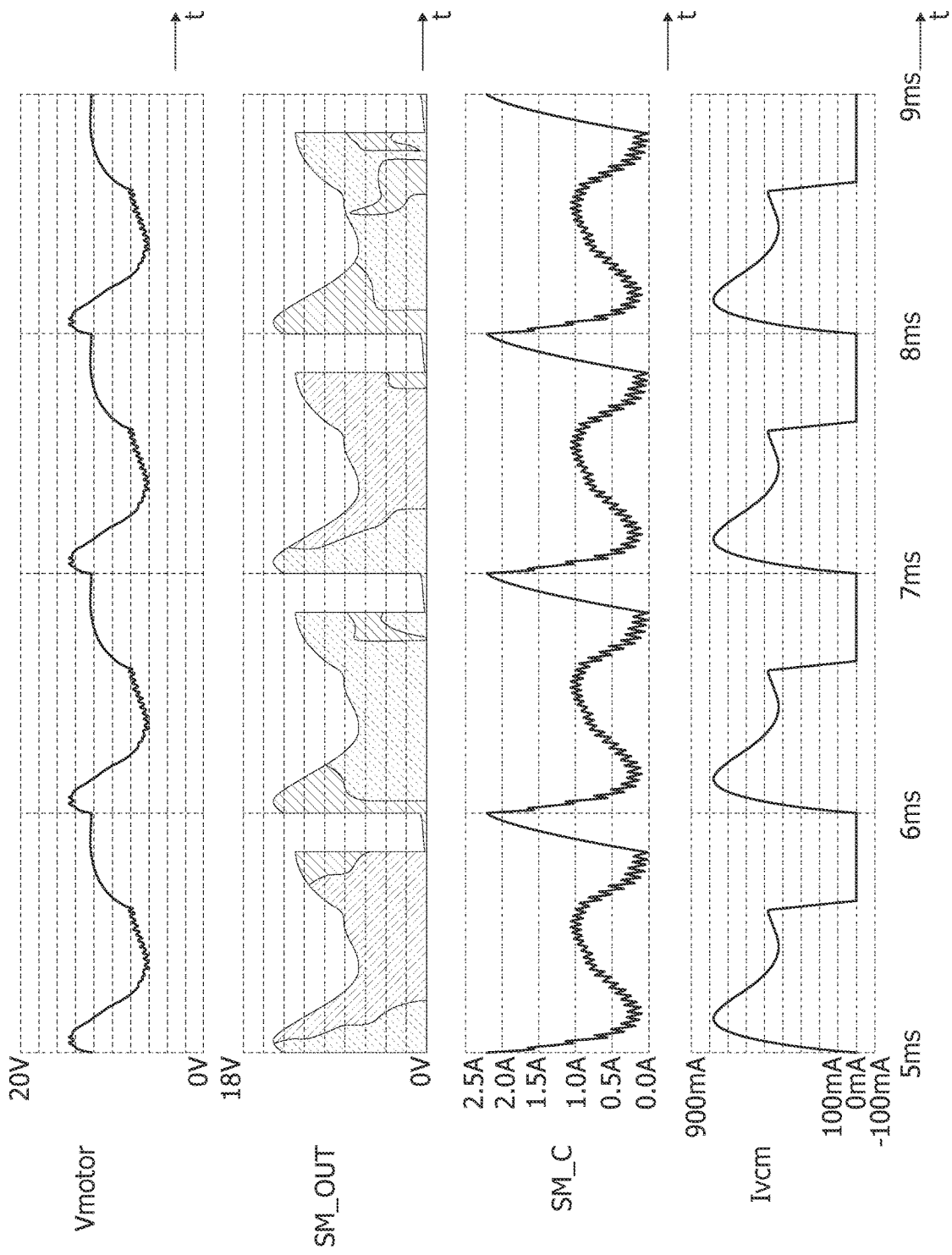
FIGS. 8 and 9 illustrate simulation results for signals shown in FIG. 7.
Figure 9:
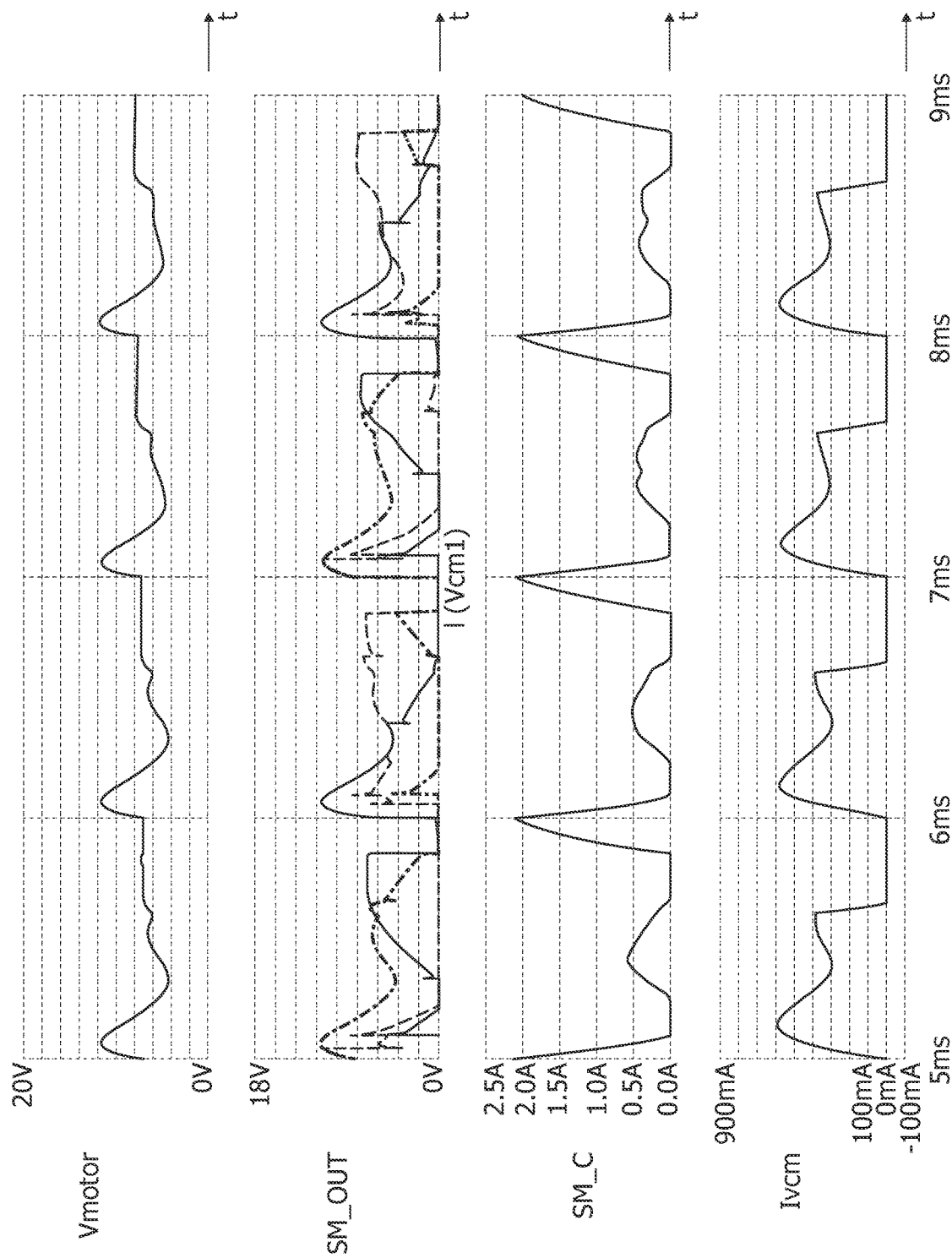

FIGS. 8 and FIG. 9 report more detailed simulation results for the signals Vmotor, SM_OUT, SM_C, and Ivcm as represented in FIG. 7.

FIG. 8 refers to BEMF rectification performed with synchronous spindle step-up: there, the three spindle motor outputs SM_OUT are represented schematically as "dominance" areas labelled in continuous lines, dashed lines and chained lines. These outputs are shown chopping at 40 KHz with a 60% duty cycle (60% active fly-back and 40% brake).

FIG. 9 refers to BEMF rectification performed with synchronous rectification. Here, the three spindle motor outputs SM_OUT are represented distinctly in continuous line, dashed line and chained line.

In both instances, during the VCM "off" time, BEMF rectification is discontinued by being interrupted by the spindle brake phase BRK (by way of example, the spindle brake phase BRK can occur at a programmable time before the end of VCM off time). During spindle brake time Tbrake, the spindle motor current is driven by the spindle BEMF and its amplitude (intensity) increases quickly.

Again (and still merely by way of example) VCM discontinuous mode can be performed with a Ton time of 600 microseconds and a Toff time of 400 microseconds.

When the VCM "on" time, Ton starts, the spindle current is pre-charged and is able to drive immediately an adequate current into the VCM, generating a higher torque.

Figure 10:
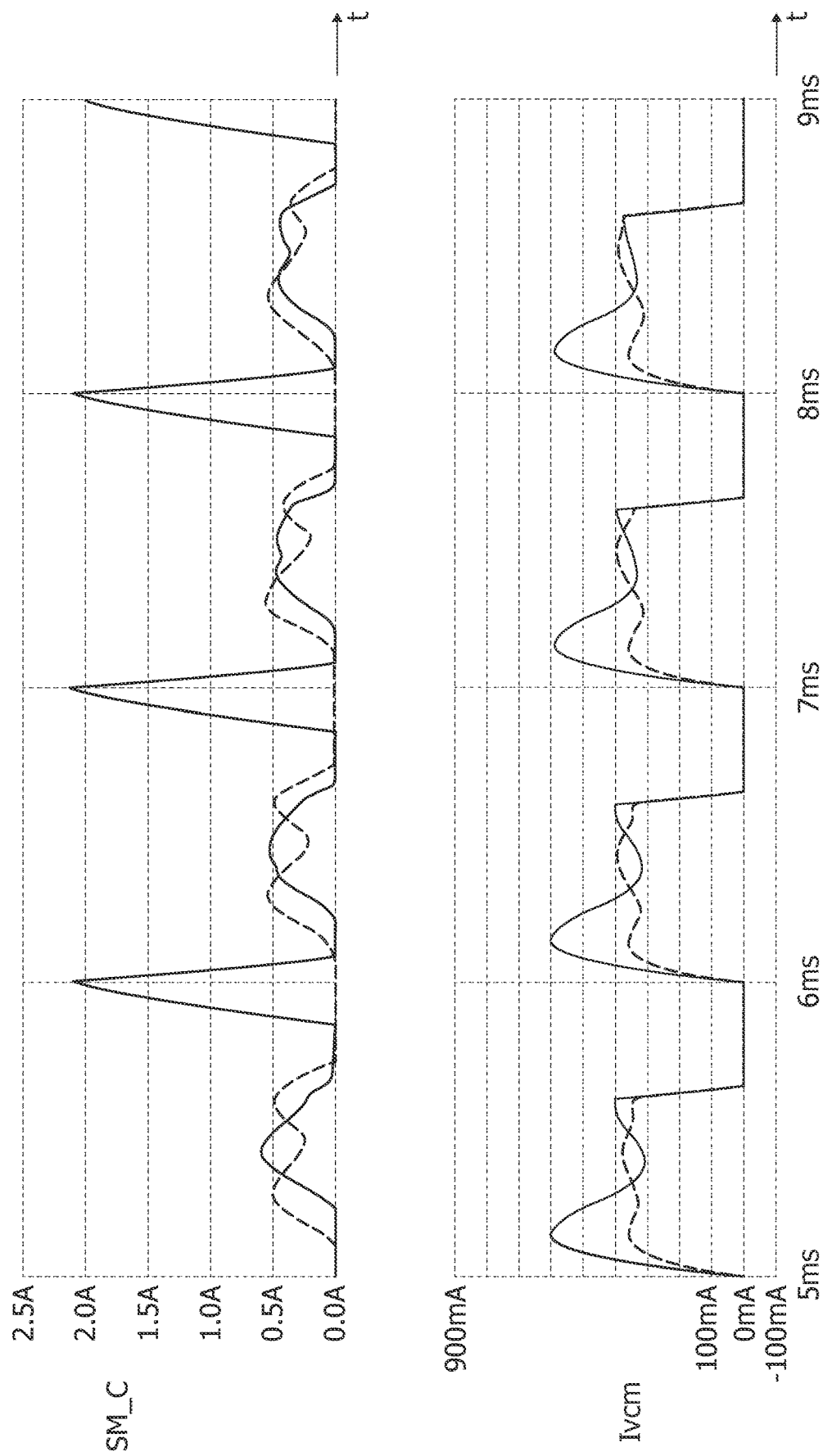
FIG. 10 illustrates a comparison of spindle motor current and voice coil motor current for conventional solutions and an embodiment.

The diagram of FIG. 10 provides a comparison of spindle motor current SM_C and VCM current Ivcm for conventional solutions (dashed lines) and the solution proposed herein: in the solution proposed herein, thanks to the spindle pre-charged current in the spindle Tbrake time during the BRK phase, an increased available current is driven into the VCM during the VCM "on" time Ton.

Of course, the quantitative values indicated/shown in FIG. 8 (VCM retract in discontinuous mode at power-off with the spindle motor BEMF rectification with synchronous spindle step-up interrupted by a brake phase BRK over a time Tbrake), FIG. 9 (VCM retract in discontinuous mode at power-off with the spindle motor BEMF rectification with synchronous rectification interrupted by a brake phase BRK over a time Tbrake), and FIG. 10 (comparison of performance of solutions as propose herein and conventional solutions) are purely indicative and non-limiting.

Without prejudice to the underlying principles, the details and embodiments may vary, even significantly, with respect to what has been described in the foregoing, by way of example only, without departing from the extent of protection.

The extent of protection is determined by the annexed claims.

What is claimed is:

1. A method, comprising:
    rectifying a back electromotive force (BEMF) of a spindle motor in a hard disk drive;
    driving, in a discontinuous mode, at least one voice coil motor (VCM) in the hard disk drive with the BEMF of the spindle motor to retract heads of the hard disk drive to a park position, the discontinuous mode comprising an alternation of VCM on-times and VCM off-times;
    discontinuing rectifying of the BEMF of the spindle motor during the VCM off-times; and
    bringing the spindle motor into a brake condition, during which the spindle motor is short-circuited and the BEMF of the spindle motor forces currents through windings of the spindle motor.

2. The method of claim 1, wherein rectifying the BEMF of the spindle motor comprises one of synchronous rectification or synchronous spindle step-up.

3. The method of claim 1, further comprising discontinuing rectifying the BEMF of the spindle motor and bringing the spindle motor into the brake condition at an end of the VCM off-times.

4. The method of claim 1, further comprising discontinuing rectifying the BEMF of the spindle motor and bringing the spindle motor into the brake condition over a predetermined portion of the VCM off-times.

5. The method of claim 4, wherein the predetermined portion of the VCM off-times is a programmable portion of the VCM off-times.

6. The method of claim 1, further comprising controlling an intensity of spindle motor current with the spindle motor brought into the brake condition.

7. The method of claim 1, further comprising driving the at least one VCM in the hard disk drive to retract the heads of the hard disk drive to the park position with a constant velocity.

8. A control circuit in a hard disk drive having a spindle motor, wherein the control circuit is configured to:
    rectify a back electromotive force (BEMF) of the spindle motor in the hard disk drive;
    drive, in a discontinuous mode, at least one voice control motor (VCM) in the hard disk drive with the BEMF of the spindle motor to retract heads of the hard disk drive to a park position, the discontinuous mode comprising an alternation of VCM on-times and VCM off-times;
    discontinue rectifying the BEMF of the spindle motor during the VCM off-times; and
    bring the spindle motor into a brake condition, wherein the spindle motor is short-circuited and the BEMF of the spindle motor forces currents through windings of the spindle motor.

9. The control circuit of claim 8, further comprising the control circuit configured to rectify the BEMF of the spindle motor using one of synchronous rectification or synchronous spindle step-up.

10. The control circuit of claim 8, further comprising the control circuit configured to discontinue rectifying the BEMF of the spindle motor and bringing the spindle motor into the brake condition at an end of the VCM off-times.

11. The control circuit of claim 8, further comprising the control circuit configured to discontinue rectifying the BEMF of the spindle motor and bringing the spindle motor into the brake condition over a predetermined portion of the VCM off-times.

12. The control circuit of claim 11, wherein the predetermined portion of the VCM off-times is a programmable portion of the VCM off-times.

13. The control circuit of claim 8, further comprising the control circuit configured to control an intensity of spindle motor current with the spindle motor brought into the brake condition.

14. The control circuit of claim 8, further comprising the control circuit configured to drive the at least one VCM in the hard disk drive to retract the heads of the hard disk drive to the park position with a constant velocity.

15. A hard disk drive, comprising:
    a spindle motor;
    at least one voice coil motor (VCM); and
    a control circuit coupled to the spindle motor and the at least one VCM, and configured to:
        rectify a back electromotive force (BEMF) of the spindle motor;
        drive, in a discontinuous mode, the at least one VCM with the BEMF of the spindle motor via a VCM power stage to retract heads of the hard disk drive to a park position, the discontinuous mode comprising an alternation of VCM on-times and VCM off-times;
        discontinue rectifying the BEMF of the spindle motor during the VCM off-times; and
        bring the spindle motor into a brake condition, wherein the spindle motor is short-circuited and the BEMF of the spindle motor forces currents through windings of the spindle motor.

16. The hard disk drive of claim 15, further comprising the control circuit configured to rectify the BEMF of the spindle motor using one of synchronous rectification or synchronous spindle step-up.

17. The hard disk drive of claim 15, further comprising the control circuit configured to discontinue rectifying the BEMF of the spindle motor and bringing the spindle motor into the brake condition at an end of the VCM off-times.

18. The hard disk drive of claim 15, further comprising the control circuit configured to discontinue rectifying the BEMF of the spindle motor and bringing the spindle motor into the brake condition over a predetermined portion of the VCM off-times.

19. The hard disk drive of claim 15, further comprising the control circuit configured to control an intensity of spindle motor current with the spindle motor brought into the brake condition.

20. The hard disk drive of claim 15, further comprising the control circuit configured to drive the at least one VCM in the hard disk drive to retract the heads of the hard disk drive to the park position with a constant velocity.

\* \* \* \* \*